(12) United States Patent
Shih

(10) Patent No.: US 6,941,058 B2
(45) Date of Patent: Sep. 6, 2005

(54) DRIVING DEVICE FOR HANDICRAFT WITH ACOUSTO-OPTIC CONTROL AND DRIVEN BY BATTERIES

(76) Inventor: Song-Po Shih, Rm. 8G, Blk. B, Tian Jian Ming Yuan, Xin Zhou Ru, Futian District, Shenzhen (CN)

( * ) Notice: Subject to any disclaimer, the term of this patent is extended or adjusted under 35 U.S.C. 154(b) by 185 days.

(21) Appl. No.: 10/640,525

(22) Filed: Aug. 14, 2003

(65) Prior Publication Data

US 2005/0036756 A1 Feb. 17, 2005

(51) Int. Cl.⁷ .............................................. G02B 6/00
(52) U.S. Cl. ..................... 385/147; 362/551; 362/555
(58) Field of Search ..................... 385/147; 362/551, 362/555, 554, 568, 583

(56) References Cited

U.S. PATENT DOCUMENTS

| | | | | |
|---|---|---|---|---|
| 4,102,121 A | * | 7/1978 | Veazey | 368/24 |
| 4,646,206 A | * | 2/1987 | Bauer et al. | 362/552 |
| 5,104,608 A | * | 4/1992 | Pickering | 362/568 |
| 5,865,533 A | * | 2/1999 | Liu | 362/583 |
| 2002/0092454 A1 | * | 7/2002 | Meyerdierks | 114/218 |
| 2004/0168270 A1 | * | 9/2004 | Choi et al. | 15/23 |

* cited by examiner

Primary Examiner—Ellen E. Kim
(74) Attorney, Agent, or Firm—Raymond Y. Chan; David and Raymond

(57) ABSTRACT

A driving device for handicrafts with acousto-optic control and driven by batteries comprises a base, a switch and a power connector at a base cavity of the base, a motor in the base which controls a rotating axis that extends to the surface of the base, a rotating plate connected to the rotating axis, a frame mounted on the rotating plate, a strip structure on external side of the frame with teeth structures on each side respectively which can slide in a sliding groove, a hole leading into the base on each side of the sliding groove respectively, small lamps under the holes, a pipe in each hole where handicrafts can be fixed, a gear mounted on the pipe to match the teeth of the strip, a battery compartment and a control circuit in the base which includes a sound inductive circuit and a light inductive circuit.

9 Claims, 5 Drawing Sheets

DRIVING DEVICE FOR HANDICRAFT WITH ACOUSTO-OPTIC CONTROL AND DRIVEN BY BATTERIES

BACKGROUND OF THE PRESENT INVENTION

1. Field of Invention

The invention relates to a driving device, and particularly to a driving device for handicraft with acousto-optic control and driven by batteries.

2. Description of Related Arts

Conventional driving devices for handicrafts that are on the market, especially driving devices for optical-fiber handicraft generally utilize a motor to drive a rotary plate to revolve so as to produce dynamic visual effects. Driving devices as such are only capable of performing one single function, monotonous in shape, and, as such driving devices are for driving the driving groove to revolve through driving lever, their power consumptions tend to be large, and therefore require external power such as adapters because such driving devices cannot be driven by batteries, which are inconvenient to carry around.

At the same time, as the on/off of conventional optical-fiber handicrafts can only be controlled by a lever switch, operation is inconvenient. In addition, as the multi-color light effect of conventional optical-fiber handicraft is created by passing light through colored films, the quality of the color created is poor. As a result, the convention technology of driving devices for conventional handicraft has to be improved to satisfy growing expectations of consumers.

SUMMARY OF THE PRESENT INVENTION

A main object of the present invention is to provide a driving device for handicraft with acousto-optic control and driven by batteries which can eliminate problems of the conventional technology.

Another object of the present invention is to provide a driving device for handicraft with acousto-optic control and driven by batteries which can produce different kinds of motion effect.

Another object of the present invention is to provide a driving device for handicraft with acousto-optic control and driven by batteries which is convenient to carry around.

Another object of the present invention is to provide a driving device for handicraft with acousto-optic control and driven by batteries which can be turned on by sound or light and automatically turned off.

Another object of the present invention is to provide a driving device for handicraft with acousto-optic control and driven by batteries which is capable of producing high quality colored light.

Accordingly, in order to accomplish the above objects, the present invention provides a driving device for handicraft with acousto-optic control and driven by batteries, comprising:

a base, having a base cavity and a top outer surface having a sliding groove defined thereon, wherein a switch, a power connector and a control circuit board are located therewithin, a rotating axis extending from said base cavity to said top surface, a round rotating plate, wherein said rotating axis is securely connected to an edge area of said round rotating plate, a frame having an internal width equal to a circumference of said round rotating plate is mounted on said round rotating plate;

a motor for controlling said rotating axis;

a strip structure, having teeth structure on both sides, wherein said strip structure is connected securely to a side of said frame in such a manner that said strip structure slides backwardly and forwardly in said sliding groove of said top outer surface of said base;

a plurality of holes are defined besides each side of said sliding groove respectively, wherein each of said holes goes through said base cavity, wherein a plurality of small lamps are located in said base cavity aligning with said holes; and a plurality of pipes extending from said holes respectively, wherein on a rim of each of said pipes is a pipe rim teeth structure forming a gear respectively.

The small lamps underneath the holes are connected to the controlling circuit allowing the lamps to flash alternatively and with different brightness. Accordingly, three different-colored small lamps of red, green and blue color are underneath each of the holes.

Driving devices such as gears include a small belt pulley on the motor axis and a large belt pulley, wherein the small belt pulley and the big belt pulley are connected with a belt, in such a manner that the large belt pulley is connected to a small gear on the same axis, the small gear is connected to another large gear, wherein the rotating speed of the rotating axis that extends to the surface of the base is controlled by many groups of such combinations.

The switch of the device has three operation positions, wherein the middle position turns off all power supply, the position at one end controls the small lamps to flash and the motor to turn, and the position at the other end controls electronic music playing, as well as the small lamps to flash and the motor to run. The control circuit also enables the turning off of power at a pre-determined moment, in other words, the control circuit controls automatic power turn-off after certain period of time.

There is a securing structure for securing the two pipes to the two holes, wherein the securing structure also enables the sliding forwardly and backwardly in the groove of the strip-shape structure in a secured manner.

The present invention, can secure a handicraft so as to produce special movement effects such as flapping wings, moreover, as it can be driven by batteries, it is convenient to carry around and stored. Furthermore, as the present invention can be switched on by sound or light and switched off by a timer circuit, remote control is made possible therefore a user do not have to pay any attention in switching it off. The present invention can also bring an unexpected surprise to users as its flickering flash of different colors are of much higher quality then conventional driving devices.

These and other objectives, features, and advantages of the present invention will become apparent from the following detailed description, the accompanying drawings, and the appended claims.

DETAILED DESCRIPTION OF THE PREFERRED EMBODIMENT

Figure 1:
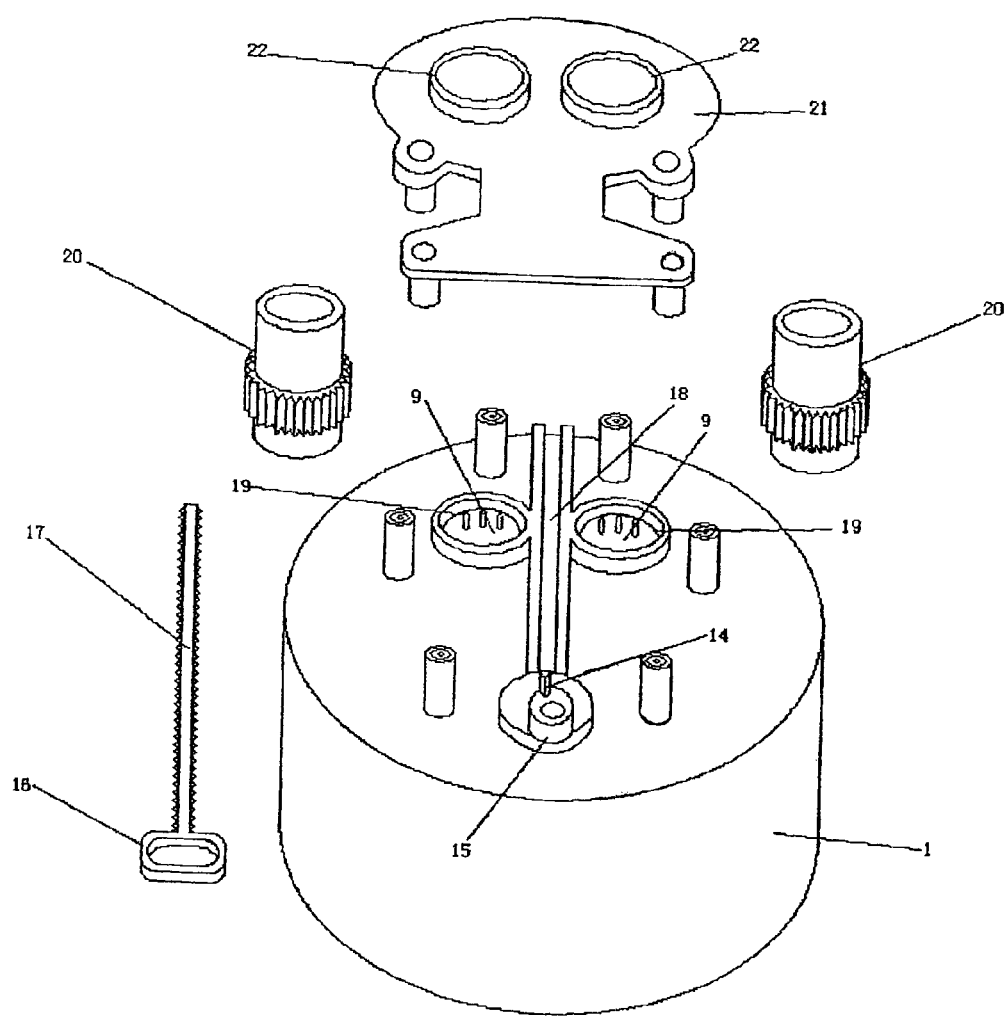
FIG. 1 is a disassembled schematic drawing of the driving device for handicraft according to a preferred embodiment of the present invention.
Figure 2:
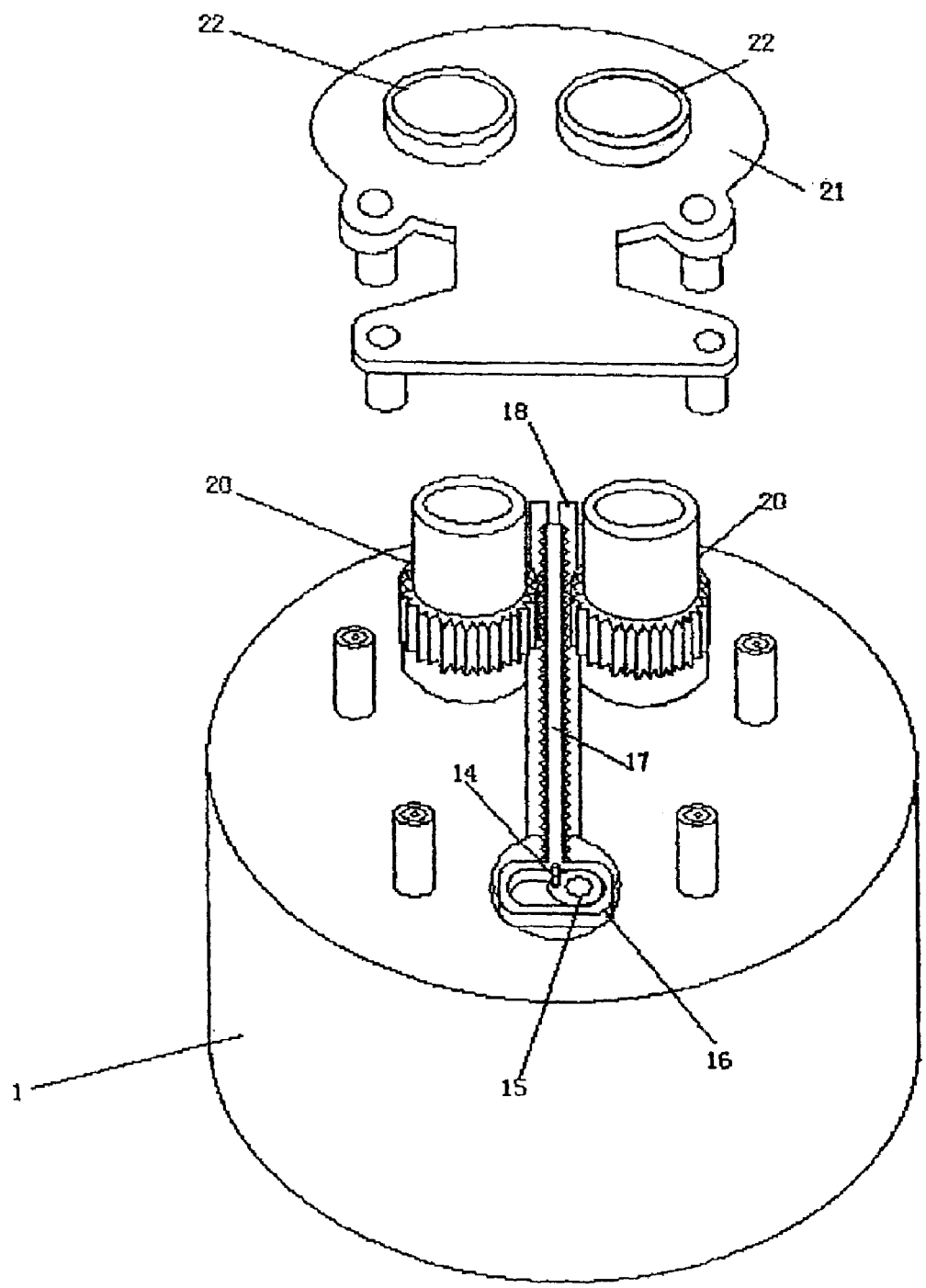
FIG. 2 is a partially assembled schematic drawing of the driving device for handicraft according to the above preferred embodiment of the present invention.
Figure 3:
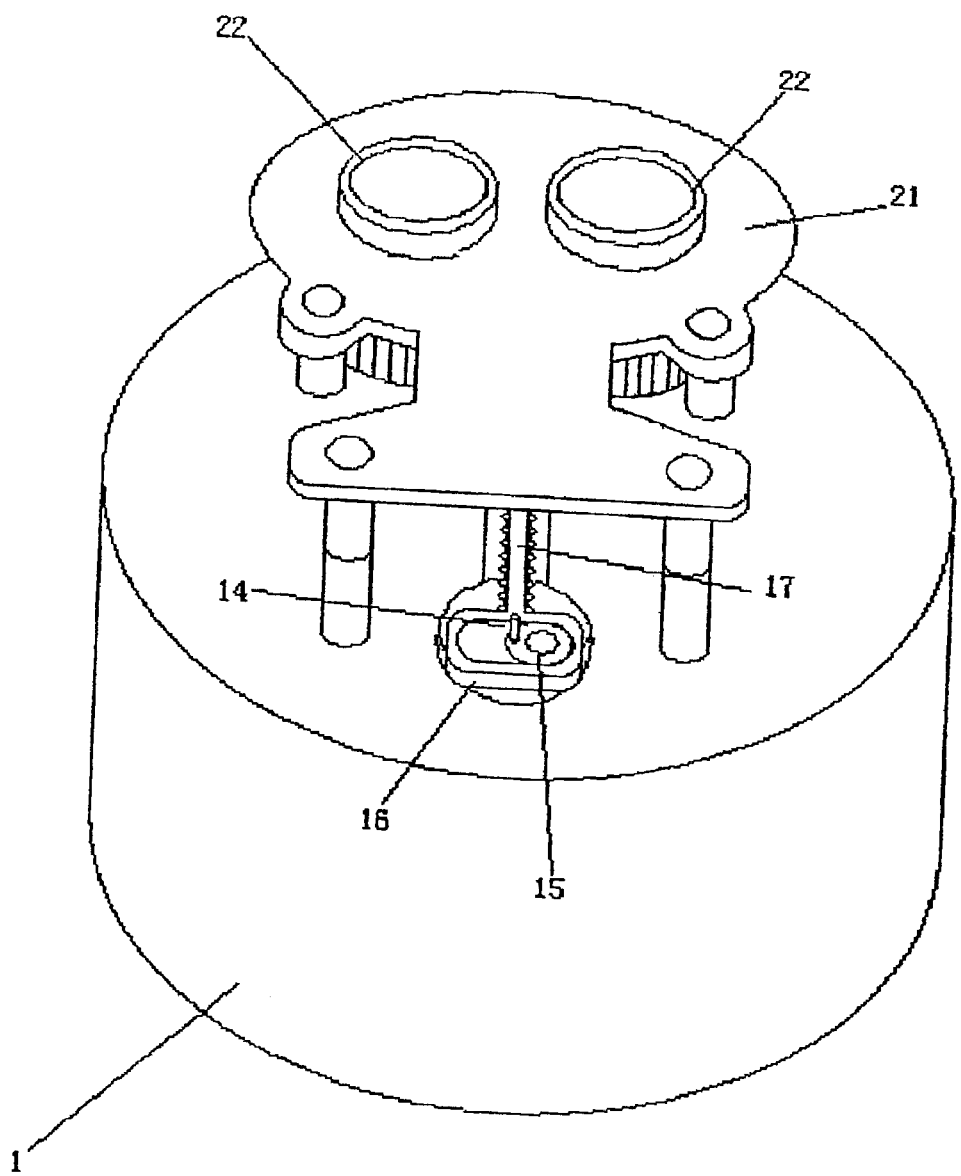
FIG. 3 is an assembled schematic drawing of the driving device for handicraft according to the above preferred embodiment of the present invention.
Figure 4:
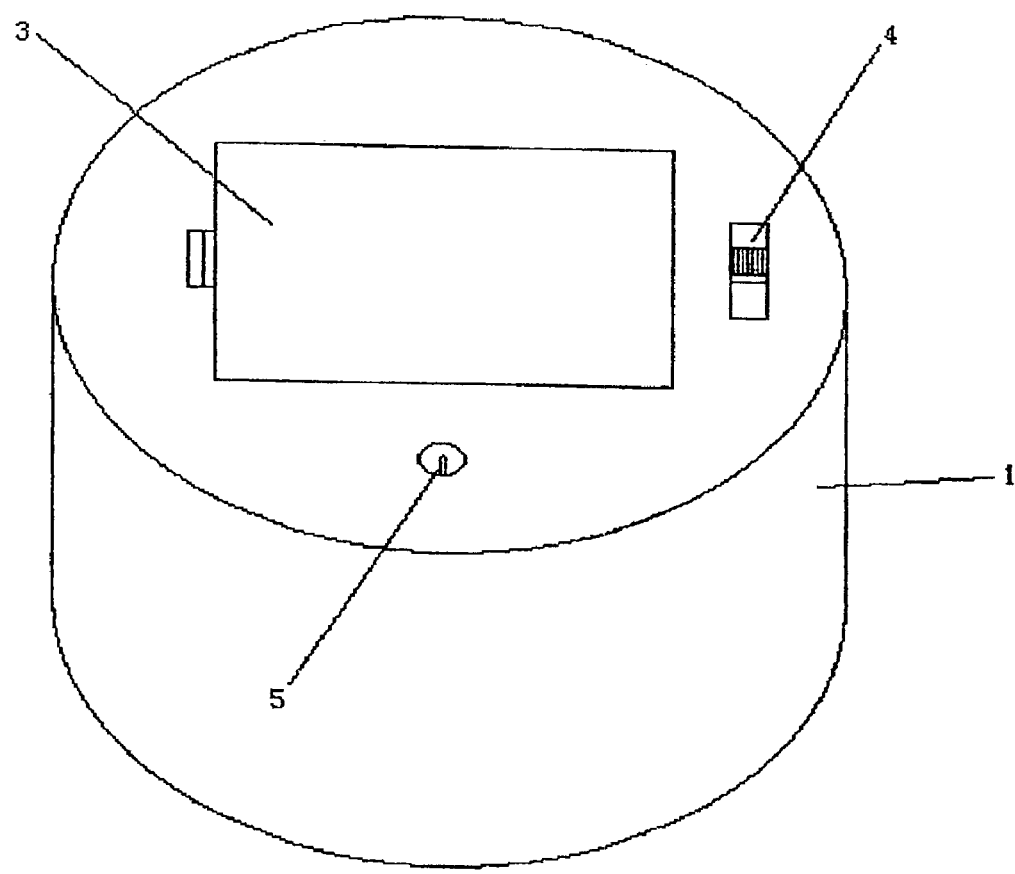
FIG. 4 is a schematic drawing of the base structure of the driving device for handicraft according to the above preferred embodiment of the present invention.
Figure 5:
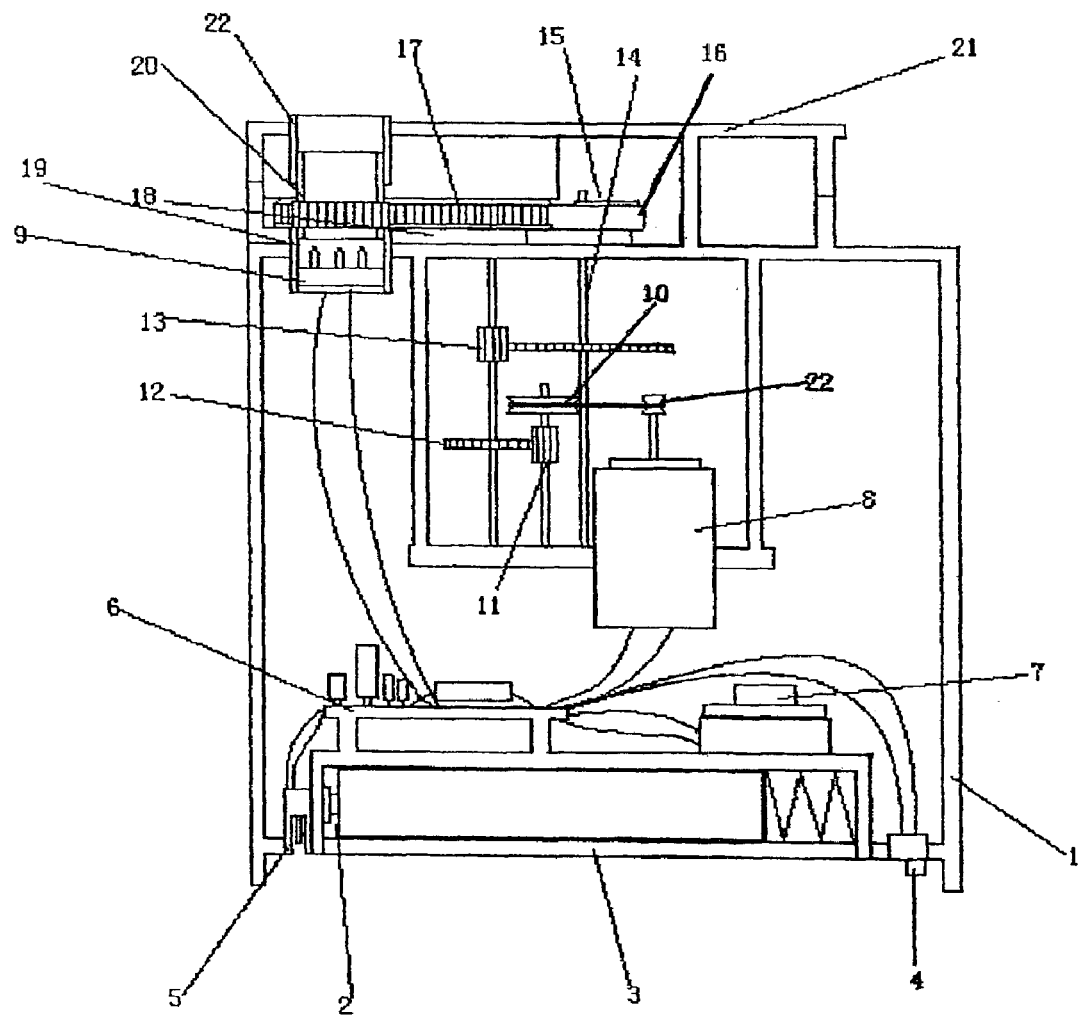
FIG. 5 is a schematic drawing of the internal structure of the driving device for handicraft according to the above preferred embodiment of the present invention.

Referring to FIG. 1 and FIG. 4 of the drawings, a driving device with asousto-optic control and driven by batteries according to a preferred embodiment of the present invention is illustrated, wherein the driving device comprises a base 1, wherein a battery compartment 2 is defined therewithin. Together with a cover 3, the battery compartment 2 is adapted for inserting batteries.

The base 1 further comprises a three-positional switch 4, a power connector 5 for an external power adaptor, wherein the three-positional switch 4 is connected both to a battery inside the battery compartment 2 and the power connector 5 for an external power source, a circuit board 6 connected to the three-positional switch 4, a speaker 7 connected to the circuit board 6, a motor 8 having a rotating axis, wherein the motor 8 is secured and a circuit boards 9 for controlling two groups of small lamps located at the upper inner surface of the base 1.

When the power connector 5 is connected with an external power source or when batteries are inserted and when the three-positional switch 4 is in an off position, power will not be connected therefore no components will work. When the three-positional switch 4 is in a first on position, the rotating axis of motor 8 will start turning.

A small belt pulley 22 on the same rotating axis is in connection a large belt pulley 10 through a belt. A small gear 11 is associated with a large gear 12, wherein the small gear 11 is secured on the same axis as the large belt pulley 10. A second small gear 13 is secured on the axis as the large gear 12.

Through combinations of such gears, the rotational speed of the motor 8 at rotating axis 14 is finally reduced to a device rotational speed require by the device. The rotating axis 14 extends to the surface of the base 1. An edge of a round rotating plate 15 is securely connected to the rotating axis 14, so that as the rotating axis 14 rotates, the round rotating plate 15 performs circumferential movement with the rotating axis 14 as the center and with its own diameter as radius. A frame 16 has an inner frame hole, wherein the rotating plate 15 is located therewithin. The width of the frame 16 equals to the diameter of the round rotating plate 15 while the length of the frame is twice as long as the distance defined by the rotating axis 14 and an opposite edge of the round rotating plate 15.

A strip structure 17 extends from a side of the frame 16, wherein a strip structure base of the strip structure 17 is sits in a sliding groove 18 so that when the round rotating plate 15 rotates, the frame 16 will be driven to make a linear movement and that in turns results in the corresponding linear movement of the strip-shaped structure 17 in the sliding groove 18.

Two holes 19 are defined besides each side of the sliding groove 18 respectively, wherein each of the two holes 19 goes through the base 1, and facing directly to two circuit boards 9 respectively, wherein each of the circuit boards 9 controls the two groups of the small lamps inside the base 1 respectively.

Each of the group of small lamps contains three small lamps of three different colors of red, green and blue. Two pipes 20 are extending from each of the holes 19 respectively, wherein on a rim of each of the two pipes 20 is a pipe rim teeth structure, forming a gear, each of which matches with a strip teeth structure on each side of the strip structure 17 respectively, so that when the strip structure 17 slides forwardly and backwardly on sliding groove 18, the two pipes 20 revolves clockwise and anti-clockwise alternatively.

At a pipe top of each of the pipes 20, a securing structure 21 is secured to the base 1 with screws respectively, wherein the securing structure 21 has two securing holes 22 defined therewithin, wherein the two securing holes are located aligningly with the two pipes 20 respectively to hold the pipes in place. A securing structure sliding groove is also aligned to the sliding groove 18 so that the strip structure 17 will slides in the two grooves securely.

Consequently, when the power connector 5 is connected to the external power source and the switch 4 is turned on, the circuit boards 9 controlling the two groups of small lamps will connect power to the circuit and the small lamps of different colors flash alternately. The light produced from the lamps passes through the holes 19 and pipes 20 and thus into the handicrafts fixed in the pipes 20.

In one preferred embodiment, optical-fiber beams are fixed in the pipes 20 and arranged into a radiating form of a wing. The light passing through the optical-fiber will have colorful effect of three colors changing alternately. At the same time, as the motor 8 drives the rotating axis 14 to rotate via a series of driving devices and the two pipes 20 to revolve clockwise and anti-clockwise alternatively via the said driving devices, the wing-shaped optical-fiber handicrafts fixed in the two pipes 20 will also revolve, making the wing flap and producing dynamic effect of changing colors that have very strong ornamental effect.

According to the preferred embodiment, the circuit board 6 inside the base 1 further comprises a timer circuit and an inductive circuit. The timer circuit automatically cuts off power after a certain period of time of power connection while the inductive circuit is capable of inducting to change of light and sound so that when light is turned on or off suddenly, or noise pattern changes suddenly such as air vibration caused by hand-clapping or loud speaking voice, the circuit will be initiated at once to generate lighting effect. After a certain period of time, the timer circuit will automatically turn off the device. Consequently, the present invention can produce a surprising decorative result.

When the three-positional switch 4 is in a second on position, the circuit will connect to another circuit that produces sound with the speaker 7 playing electronic music to accompany the change of colors and revolving movement to enhance the accessorizing art effect. After a certain period of time, the device will stop automatically in the same way to be initiated again by the next sound or light change.

What is claimed is:

1. A driving device with acousto-optic control and driven by batteries comprising:

a base, having a base cavity and a top outer surface having a sliding groove defined thereon, wherein a switch, a power connector and a control circuit board are located therewithin, a rotating axis extending from said base cavity to said top surface, a rotating plate, wherein said rotating axis is securely connected to an edge area of said rotating plate, a frame having an internal width equal to a circumference of said rotating plate is mounted on said rotating plate;

a motor for controlling said rotating axis;

a strip structure, having teeth structures on both sides respectively, wherein said strip structure is connected securely to a side of said frame in such a manner that said strip structure slides backwardly and forwardly in said sliding groove of said top outer surface of said base;

a plurality of holes are defined besides each side of said sliding groove respectively, wherein each of said holes goes through said base cavity, wherein a plurality of small lamps are located in said base cavity aligning with said holes; and a plurality of pipes extending from said holes respectively, wherein on a rim of each of said pipes is a pipe rim teeth structure forming a gear respectively.

2. The driving device with acousto-optic control and driven by batteries, as recited in claim 1, wherein said plurality of holes are two holes and said plurality of pipes are two pipes.

3. The driving device with acousto-optic control and driven by batteries, as recited in claim 2, further comprising control circuits connected to said plurality of small lamps wherein said control circuits control a brightness and a frequency with which said plurality of small lamps flashes.

4. The driving device with acousto-optic control and driven by batteries, as recited in claim 3, further comprising a rotating axis speed controller, comprising:

a small belt pulley on said rotating axis of said motor;

a large belt pulley connected to said small belt pulley through a belt;

a small gear on the same axis as the large belt pulley is securely connected to said large belt pulley; and a large gear matched with said small gear.

5. The driving device with acousto-optic control and driven by batteries, as recited in claim 4, wherein said switch has an off position, a first on position and a second on position, wherein when said switch is in said off position, all power is cut off, when said switch is in said first on position, said plurality of small lamps flashes and said motor turns, and when said switch is in said second on position, electronic music is played, said plurality of small lamps flashes and said motor turns.

6. The driving device with acousto-optic control and driven by batteries, as recited in claim 5, wherein said control circuit further comprises a power-off timer circuit that cuts off power automatically after a certain period of operation time.

7. The driving device with acousto-optic control and driven by batteries, as recited in claim 6, wherein on top of said base further comprising a securing structure securely connected with said base, wherein two securing holes are defined therewithin, wherein said two securing holes are located aligningly with said pipes; a sliding securing structure sliding groove positioned aligningly with said sliding groove on top of said base.

8. The driving device with acousto-optic control and driven by batteries, as recited in claim 7, wherein in said plurality of holes are optical-fiber handicrafts.

9. The driving device with acousto-optic control and driven by batteries, as recited in claim 8, wherein said optical-fiber handicrafts have a function of revolving wings.

* * * * *